United States Patent [19]

Pappo et al.

[11] 3,868,413

[45] Feb. 25, 1975

[54] 2-(4-HYDROXY-1-ALKYNYL)-5-OXOCYCLOPENT-1-ENEALKANOIC ACIDS, 3-HYDROXY CONGENERS CORRESPONDING AND DERIVATIVES THEREOF

[75] Inventors: Raphael Pappo, Skokie; Paul W. Collins, Deerfield, both of Ill.

[73] Assignee: G. D. Searle & Co., Chicago, Ill.

[22] Filed: Nov. 2, 1973

[21] Appl. No.: 412,428

Related U.S. Application Data

[63] Continuation-in-part of Ser. No. 43,577, June 4, 1970, Pat. No. 3,770,776.

[52] U.S. Cl....... 260/514 D, 260/410.9 R, 260/413, 260/468 D, 260/488 R

[51] Int. Cl...................... C07c 61/36, C07c 69/74

[58] Field of Search..... 260/408 D, 514 D, 410.9 R, 260/413, 488 R

[56] References Cited
OTHER PUBLICATIONS

Hardegger et al., Helv. Chim. Acta., 50, 2501 (1967).

*Primary Examiner*—Robert Gerstl
*Attorney, Agent, or Firm*—John A. Dhuey

[57] ABSTRACT

The above-captioned compounds, prepared by a synthetic sequence starting with 2,3,5-trioxocyclopentanealkanoic acids, are useful pharmacological agents as is evidenced by their anti-ulcerogenic, anti-secretory and anti-microbial properties.

9 Claims, No Drawings

2-(4-HYDROXY-1-ALKYNYL)-5-OXOCYCLOPENT-1-ENEALKANOIC ACIDS, 3-HYDROXY CONGENERS CORRESPONDING AND DERIVATIVES THEREOF

This application is a continuation-in-part of our copending application Ser. No. 43,577, filed June 4, 1970, now U.S. Pat. No. 3,770,776.

The present invention is concerned with novel cyclopentane derivatives defined by the following structural formula

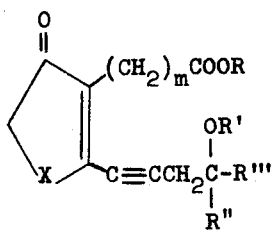

wherein R is hydrogen or a lower alkyl radical, R' is hydrogen, a tetrahydropyran-2-yl or lower alkanoyl radical, R'' is hydrogen or a lower alkyl radical, R''' is a lower alkyl radical, X is a methylene, hydroxymethylene or (lower alkanoyl)oxymethylene radical, and $m$ is an integer greater than 5 and less than 8.

The lower alkyl radicals embraced by the foregoing formula are typified by methyl, ethyl, propyl, butyl, pentyl, hexyl, heptyl, and the branched-chain isomers thereof.

The lower alkanoyl radicals designated in that formula are exemplified by formyl, acetyl, propionyl, butyryl, valeryl, caproyl, heptanoyl, and the corresponding branched-chain isomers.

Manufacture of the novel compounds of the present invention is conveniently achieved by utilizing oxoalkanoic acids and oxalic acid esters as starting materials. As a specific example, 9-oxodecanoic acid is condensed with dimethyl oxalate in the presence of potassium tertiarybutoxide to afford, 2,3,5-trioxo-4-methoxalylcyclopentaneheptanoic acid. Heating of that ester with hydrochloric acid results in loss of the alkoxalyl side chain, thus affording 2,3,5-trioxocyclopentaneheptanoic acid. That triketo acid is selectively reduced by catalytic hydrogenation, suitably with a 5% palladium-on-carbon catalyst to yield 2,5-dioxocyclopentaneheptanoic acid. Enolether formation with concomitant esterification of the carboxyl group is effected, for example, by reaction with a lower alkanol in the presence of an acid catalyst. Reaction of 2,5-dioxocyclopentaneheptanoic acid with ethanol and sulfuric acid in benzene thus affords ethyl 2-ethoxy-5-oxocyclopent-1-eneheptanoate. Conversion to the free carboxylic acid is conveniently effected by room temperature saponification in ethanol, thus providing 2-ethoxy-5-oxocyclopent-1-eneheptanoic acid. Condensation of that acid with 4(RS)-tetrahydropyran-2-yloxy-1-octynyl magnesium bromide results in 2-(4(RS)-tetrahydropyran-2-yloxy-1-octynyl)-5-oxocyclopent-1-eneheptanoic acid. Removal of the tetrahydropyran-2-yl protecting group is effected by acid cleavage, suitably with hydrochloric acid in methanol, thus affording 2-(4(RS)-hydroxyl-1-octynyl)-5-oxocyclopent-1-eneheptanoic acid.

The instant 3-oxygenated derivatives are produced by utilizing the corresponding 3-oxygenated cyclopentane intermediates. Typically, 2,3,5-trioxocyclopentaneheptanoic acid is converted to 2,5-dioxo-3-hydroxycyclopentaneheptanoic acid by catalytic hydrogenation, utilizing 5% palladium-on-carbon catalyst; the latter product is treated with methanol in the presence of sulfuric acid to afford methyl 2-methoxy-4-hydroxy-5-oxocyclopent-1-eneheptanoate; that ester is saponified with dilute aqueous sodium hydroxide in methanol to afford 2-methoxy-4-hydroxy-5-oxocyclopent-1-eneheptanoic acid; and the latter acid is condensed with 4(RS)-tetrahydropyran-2-yloxy-1-octynyl magnesium bromide to produce 3-hydroxy-2-(4(RS)-tetrahydropyran-2-yloxy-1-octynyl)-5-oxocyclopent-1-eneheptanoic acid. Removal of the tetrahydropyran-2-yl group is achieved by the method detailed hereinbefore, thus affording 3-hydroxy-2-(4(RS)-hydroxy-1-octynyl)-5-oxocyclopent-1-eneheptanoic acid.

The tertiary alcohols of the present invention as defined in the foregoing structural formula wherein R'' is a lower alkyl radical are preferably manufactured by reaction of the appropriate Grignard reagent with a 4-methoxymethoxycyclopentane derivative of the type described in U.S. Pat. No. 3,558,682, issued Jan. 26, 1971. 2-Methoxy-4-methoxymethoxy-5-oxocyclopent-1-eneheptanoic acid, for example, is thus allowed to react with 4(RS)-tetrahydropyran-2-yloxy-4(RS)-methyl-1-octynyl magnesium bromide and the resulting product is treated with hydrochloric acid in methanol to effect cleavage of the tetrahydropyran-2-yl and methoxymethoxy protecting groups, thus affording 3-hydroxy-2-(4(RS)-hydroxy-4(RS)-methyl-1-octynyl)-5-oxocyclopent-1-eneheptanoic acid.

The carboxylic acid esters of the present invention are readily obtained by esterification of the corresponding acids. For example, 3-hydroxy-2-(4-hydroxy-1-octynyl)-5-oxocyclopent-1-eneheptanoic acid is contacted with ethereal diazomethane to afford methyl 3-hydroxy-2-(4(RS)-hydroxy-1-octynyl)-5-oxocyclopent-1-eneheptanoate.

The lower alkanoyl derivatives of the present invention are obtained by reaction of the corresponding hydroxy substances with a lower alkanoic acid anhydride or halide, preferably in the presence of a suitable acid acceptor such as pyridine or triethylamine. Thus, 3-hydroxy-2-(4-(RS)-hydroxyl-1-octynyl)-5-oxocyclopent-1-eneheptanoic acid is contacted with acetic anhydride and pyridine to afford 3-acetoxy-2-(4(RS)-acetoxy-1-octynyl)-5-oxocyclopent-1-eneheptanoic acid.

The optically active R and S derivatives of this invention are obtained by utilizing, as intermediates, the appropriate optically active acetylenic alcohols. 1—Octyn—4(RS)—ol, for example, is converted to the phthalic acid half-ester by reaction with phthalic anhydride and the half-ester is reacted with (-)α-methylbenzylamine to afford the diastereomeric salts, which are separated by fractional crystallization, then hydrolyzed to afford the individual R and S acetylenic alcohols.

The compounds of the present invention exhibit valuable pharmacological properties. They are, for example, anti-ulcerogenic and anti-secretory agents. In addition, they possess anti-microbial activity as is evidenced by their ability to inhibit the microbial growth of bacteria such as *Erwinia sp.*, protoza such as *Tetrahymena pyriformis* and fungi such as *Trichophyton mentagrophytes* and *Verticillium albo-atram*.

The anti-secretory activity of the compounds of the present invention is detected by the following assay procedure:

Adult female beagle dogs weighing 4.5–7.3 kg. are equipped with a teflon-stainless steel gastric cannula implanted in the most dependent portion of the stomach near the antrum. After a recovery period of 1 month following surgery, the animals are fasted for approximately 20 hours, then are placed in a leather sling permitting only limited movement. The gastric cannula is opened and cleansed with warm (37°C.) saline solution. The dogs are injected with either of two secretogogues, histamine or pentagastrin, at a dose approximately equal to ⅔ of that which will effect maximal stimulation. Immediately thereafter the test compound dissolved in iso-osmotic buffer solution is administered subcutaneously. The gastric juice is collected for a period of 2 hours following administration of the secretogogue and the total volume is measured. These results are compared with those obtained from control dogs treated with the secretogogue alone. A compound is rated active if statistically significant inhibition of secretory parameters occur following compound treatment.

The anti-ulcerogenic properties of the instant compounds are evidenced by their activity in the assay described in detail in U.S. Pat. No. 3,479,357. The assays used to detect the anti-bacterial and anti-protozoal activity of the compounds of the present invention are described in U.S. Pat. No. 3,692,799, while the procedures for detection of their anti-fungal activity are recited in U.S. Pat. No. 3,682,951.

The invention will appear more fully from the examples which follow. These examples are given by way of illustration only and are not to be construed as limiting the invention either in spirit or in scope as many modifications both in materials and in methods will be apparent from this disclosure to those skilled in the art. In these examples temperatures are given in degrees Centigrade (°C.) and quantities of materials in parts by weight unless otherwise noted.

EXAMPLE 1

To a solution of 56.5 parts of potassium metal in 936 parts of tertiary-butyl alcohol is added successively 102 parts of dimethyl oxalate and a solution of 54 parts of 9-oxodecanoic acid in 156 parts of tertiary-butyl alcohol. That addition is carried out over a period of about 40 minutes while the mixture is heated at the reflux temperature in an atmosphere of nitrogen. At the end of the addition period, heating is continued for about 90 minutes longer and the reaction mixture is cooled and filtered under nitrogen. The filter cake is added to a solution of dilute hydrochloric acid and that mixture is extracted with chloroform. The chloroform layer is separated, washed with water, dried over anhydrous sodium sulfate and stripped of solvent under reduced pressure. Recrystallization of the resulting residue from ether affords, 2,3,5-trioxo-4-methoxalylcyclopentaneheptanoic acid, melting at about 127°–129°.

EXAMPLE 2

A mixture containing 50 parts of 2,3,5-trioxo-4-methoxyalylcyclopentaneheptanoic acid and 2,880 parts by volume of 2N hydrochloric acid is slowly distilled in a nitrogen atmosphere for about 2 hours, then is cooled and decolorized with activated carbon. The filtrate thus obtained is concentrated to dryness under reduced pressure and the resulting residue is extracted with ethyl acetate. That organic solution is washed several times with saturated aqueous sodium chloride, then with water and finally dried over anhydrous sodium sulfate and stripped of solvent by distillation under reduced pressure. Recrystallization of the resulting residue from water affords pure 2,3,5-trioxocyclopentaneheptanoic acid, melting at about 102°–104°.

EXAMPLE 3

A mixture containing 45.7 parts of 2,3,5-trioxocyclopentaneheptanoic acid, 13 parts of 5% palladium-on-carbon catalyst, 453 parts of glacial acetic acid and 63.3 parts of concentrated sulfuric acid is shaken with hydrogen at a pressure of 3 atmospheres until 2 molecular equivalents of hydrogen are absorbed. The reaction mixture is then filtered and the resulting filtrate is mixed with 100 parts of solid sodium acetate. Evaporation of the mixture to dryness affords a solid residue which is extracted with water. The resulting extract is filtered and the filter cake is washed with water, dried, then recrystallized from acetone to afford white crystals of 2,5-dioxocyclopentaneheptanoic acid, melting at about 160°–161.5°.

EXAMPLE 4

A mixture containing 26 parts of 2,5-dioxocyclopentaneheptanoic acid, 560 parts of ethanol, 440 parts of benzene and 14.7 parts of concentrated sulfuric acid is slowly distilled over a period of about 40 hours, during which time approximately 200 parts of distillate is collected. The residual mixture is cooled, diluted with approximately 350 parts of ether, then washed successively with dilute aqueous sodium hydroxide and water. The resulting neutral solution is dried over anhydrous sodium sulfate and evaporated to dryness under reduced pressure to afford, as a yellow liquid, ethyl 2-ethoxy-5-oxocyclopent-1-eneheptanoate, which substance is characterized by an ultraviolet absorption maximum at about 253.5 millimicrons.

EXAMPLE 5

A mixture containing 22.16 parts of ethyl 2-ethoxy-5-oxocyclopent-1-eneheptanoate, 785 parts of 0.1N aqueous sodium hydroxide and 320 parts of ethanol is stored at room temperature for about 48 hours, then is concentrated to approximately ⅔ volume by distillation under reduced pressure. The residual solution is washed with ether, acidified with dilute hydrochloric acid, then extracted with ethyl acetate. The ethyl acetate extracts are washed with water, dried over anhydrous magnesium sulfate and evaporated to dryness by distillation under reduced pressure. The residual solid residue is purified by recrystallization from ether-benzene to afford 2ethoxy-5-oxocyclopent-1-eneheptanoic acid, melting at about 65°–66°.

EXAMPLE 6

To a solution of 2.5 parts of 1octyn-4(RS)-ol in 10 parts of benzene is added 1.6 parts of dihydropyran and 0.15 part of p-toluenesulfonic acid. The initial exothermic reaction is controlled by cooling in an ice bath and the temperature is thus maintained at about 23°. The resulting reaction mixture is allowed to stand at room temperature for about 5 hours, then is diluted with benzene, washed successively with dilute aqueous sodium hydroxide and water, dried over anhydrous sodium sulfate and stripped of solvent under reduced pressure to afford 1-octyn-4(RS)-ol 4-tetrahydropyran-2-yl ether.

EXAMPLE 7

To a solution of 12.6 parts of 1-octyn-4(RS)-ol 4-tetrahydropyran-2-yl ether in 112 parts of tetrahydrofuran is added 15.25 parts by volume of 3.3 M ethereal ethyl magnesium bromide and the resulting reaction mixture is allowed to stand at room temperature for about 2 hours. This solution which contains 4(RS)-tetrahydropyran-2-yloxy-1octynyl magnesium bromide is used as such in the procedure of Example 8.

EXAMPLE 8

To 15.7 parts of the Grignard reagent prepared in Example 7, dissolved in 112 parts of tetrahydrofuran, is added 2.54 parts of 2-ethoxy-5-oxocyclopent-1-eneheptanoic acid dissolved in 67.5 parts of tetrahydrofuran. The reaction mixture is kept under an atmosphere of nitrogen and is stirred at room temperature for about 24 hours, at the end of which time it is poured into approximately 350 parts of cold water. Acidification of that aqueous mixture with dilute hydrochloric acid is followed by extraction of the resulting acidic mixture with ether. The ether extracts are combined, then extracted several times with dilute aqueous potassium carbonate. Those alkaline extracts are combined, washed with ether and made acidic by the addition of dilute hydrochloric acid. Extraction of the latter mixture with ether affords an organic solution, which is dried over anhydrous sodium sulfate and concentrated to dryness under reduced pressure to afford 2-(4(RS)-tetrahydropyran-2-yloxy-1-octynyl)-5-oxocyclopent-1-eneheptanoic acid.

EXAMPLE 9

A mixture containing 3.5 parts of 2-(4(RS)-tetrahydropyran-2-yloxy-1-octynyl)-5-oxocyclopent-1-eneheptanoic acid, 48 parts of acetone, 30 parts of water, 1.6 parts of methanol and 1.2 parts of concentrated hydrochloric acid is allowed to stand at room temperature for about 4 hours. At the end of that reaction period, the mixture is concentrated to approximately ½ volume, then is made alkaline by the addition of dilute aqueous potassium carbonate. The alkaline solution is washed several times with ether, then is acidified with dilute hydrochloric acid and the resulting acidic solution is extracted with ether. The ether extracts are combined, dried over anhydrous sodium sulfate and evaporated to dryness under reduced pressure, thus affording a solid residue, which, after recrystallization from ether, affords 2-(4(RS)-hydroxy-1-octynyl)-5-oxocylopent-1-eneheptanoic acid, melting at about 53°–54°.

EXAMPLE 10

To a solution of 2 parts of 2,3,5-trioxocyclopentaneheptanoic acid in 50 parts of 70% aqueous isopropyl alcohol is added 0.2 part of 5% palladium-on-carbon catalyst and the resulting reaction mixture is shaken with hydrogen at atmospheric pressure and room temperature until 1 molecular equivalent of hydrogen has been absorbed. The catalyst is removed by filtration and the solvent is distilled under reduced pressure to afford the crude product as a solid residue. Purification by recrystallization from water affords pure 2,5-dioxo-3-hydroxy-cyclopentaneheptanoic acid, melting at about 127°–129.5°.

EXAMPLE 11

A solution containing 10 parts of 2,5-dioxo-3-hydroxycyclopentaneheptanoic acid in 1000 parts by volume of 1% methanolic hydrogen chloride is stored at room temperature for about 60 hours, then is concentrated to dryness under reduced pressure. The resulting residue is dissolved in 280 parts of methanol and 10 parts of diazomethane dissolved in ether is added. Concentration of that reaction mixture to dryness affords a residue containing methyl 2-methoxy-3-hydroxy-5-oxocyclopent-1-eneheptanoate and methyl 2-methoxy-4-hydroxy-5-oxocyclopent-1-eneheptanoate. Recrystallization from ether affords the latter compound.

The material obtained from the aforementioned ether filtrate is dissolved in 42 parts of ether and 4 parts of methanol containing 0.08 part of hydrogen chloride is added. The resulting mixture is allowed to stand at room temperature for approximately 5 days and the crystalline material which separates is additional methyl 2-methoxy-4-hydroxy-5-oxocyclopent-1-eneheptanoate. The filtrate is concentrated to dryness and the residue is recrystallized first from acetone-hexane, then from water to afford methyl 2,5-dioxo-3-hydroxycyclopentaneheptanoate, melting at about 98°–99°.

EXAMPLE 12

To a solution of 5 parts of methyl 2-methoxy-4-hydroxy-5-oxocylopent-1-eneheptanoate in 120 parts of methanol is added 185 parts of 0.1N aqueous sodium hydroxide and the resulting reaction mixture is kept at room temperature for about 24 hours, then is stripped of organic solvent by distillation under reduced pressure. The residual mixture is extracted with benzene and the aqueous layer is separated, acidified with dilute hydrochloric acid, then extracted with chloroform. The residual aqueous layer is separated, then extracted with ethyl acetate. The ethyl acetate solution thus obtained is dried over anhydrous sodium sulfate, then concentrated to dryness and the resulting residue is purified by recrystallization from acetone to afford 2-methoxy-4-hydroxy-5-oxocyclopent-1eneheptanoic acid, melting at about 113.5°–117°.

EXAMPLE 13

Method A

A solution containing 0.882 part of 1-octyn-4(RS)-ol 4-tetrahydropyran-2-yl ether in 20 parts by volume of tetrahydrofuran is cooled under nitrogen to approximately −5° and 2 parts by volume of 3N ethereal ethyl magnesium bromide is added dropwise with stirring. The reaction mixture is stirred for about 2½ hours at room temperature, at the end of which time 0.256 part of 4-hydroxy-2-methoxy-5-oxocyclopent-1-eneheptanoic acid dissolved in 30 parts by volume of tetrahydrofuran is added. That mixture is heated at the reflux temperature with stirring for about 16 hours, then is cooled and quenched with dilute hydrochloric acid. Stirring is continued for about 10 minutes, at the end of which time the tetrahydrofuran is evaporated and ether is added. The ether layer is separated and extracted with aqueous potassium carbonate. The alkaline extract is then acidified and extracted with ethyl acetate. The ethyl acetate layer is separated, dried over anhydrous sodium sulfate and stripped to dryness under reduced pressure. The resulting crude product is purified on a chromatographic column, thus affording 3-hydroxy-2-(4(RS)-hydroxy-1-octynyl)-5-oxocyclopent-1-eneheptanoic acid.

Method B

To a solution of 3.53 parts of 1-octyn-4(RS)-ol in 150 parts by volume of tetrahydrofuran at approximately 0°, is added dropwise 16 parts by volume of 3M ethereal ethyl magnesium bromide. The resulting reaction mixture is stirred at room temperature for about 5 hours, at the end of which time 1 part of 4-hydroxy-2-methoxy-5oxocyclopent-1-eneheptanoic acid dissolved in 50 parts by volume of tetrahydrofuran is added dropwise over a period of about 30 minutes. The resulting reaction mixture is heated at the reflux temperature for about 5 hours, then is cooled to approximately 0° and 5 parts by volume of 3M ethereal ethyl magnesium bromide is added dropwise. The mixture is stirred for approximately 2 hours at about 0°, then for an additional 2 hours at room temperature and is finally heated at the reflux temperature for about 3 hours. The reaction mixture is quenched by the addition of dilute hydrochloric acid and is stripped of solvent by distillation under reduced pressure. The resulting aqueous mixture is extracted with ethyl acetate and that organic extract is extracted with dilute aqueous potassium carbonate. The alkaline extract is washed with ethyl acetate, then is acidified with dilute hydrochloric acid and extracted with ethyl acetate. The organic layer is dried over anhyrous sodium sulfate and stripped of solvent under reduced pressure to afford the crude product, which is purified by adsorption on a silica gel chromatographic column and elution with 10% ether in benzene. The resulting product, 3-hydroxy-2-(4(RS)-hydroxy-1-octynyl)-5-oxocyclopent-1-eneheptanoic acid, melts at about 77°–80°.

EXAMPLE 14

To a stirred solution of 150 parts of 4(RS)-methyl-1-octyn-4(RS)-ol 3-tetrahydropyran-2-yl ether in about 1954 parts of dry tetrahydrofuran is added dropwise 283 parts by volume of 3 N ethereal ethyl magnesium bromide while the temperature of the solution is kept below 30°. Stirring is continued for about 1½ hours, at the end of which time 31.5 parts of 2-methoxy-4-methoxymethoxy-5-oxocyclopent-1-eneheptanoic acid dissolved in about 710 parts of tetrahydrofuran is added over a period of about 10 minutes. The reaction mixture is allowed to stand for about 16 hours, at the end of which time it is quenched by the addition of dilute hydrochloric acid. The solvent is removed by distillation under reduced pressure and the residue is diluted with benzene. The organic layer is separated and washed with water, then distilled to dryness to afford 5-(4(RS)-methyl-4(RS)-tetrahydropyran-2-yloxy-1-octynyl)-4-methoxymethoxy-2-methoxycyclopent-1-eneheptanoic acid.

The latter product is dissolved in 4400 parts of acetone, 1600 parts of water and 71 parts of concentrated hydrochloric acid and the resulting mixture is heated at the reflux temperature for about 20 hours. Removal of the acetone under reduced pressure affords an aqueous solution which is extracted with 1:1 benzene-ether. The benzene-ether solution is extracted with 5% aqueous potassium carbonate and that extract is acidified with hydrochloric acid, then extracted with benzene-ether. The latter extract is dried over anhydrous sodium sulfate and stripped of solvent under reduced pressure to afford an oily residue, which is purified by chromatography on a silicic acid column. The crude product is further purified by recrystallization from ether, thus affording 3-hydroxy-2-(4(RS)-methyl-4(RS)-hydroxy-1-octynyl)-5-oxocyclopent-1-eneheptanoic acid.

EXAMPLE 15

When an equivalent quantity of 2-ethoxy-5-oxocyclopent-1-eneoctanoic acid is substituted in the procedure of Example 8, there is produced 2-(4(RS)-tetrahydropyran-2-yloxy-1-octynyl)-5-oxocyclopent-1-eneoctanoic acid.

The substitution of an equivalent quantity of 2-(4(RS)-tetrahydropyran-2-yloxy-1-octynyl)-5-oxocyclopent-1-eneoctanoic acid in the procedure of Example 9 results in 2-(4(RS)-hydroxy-1-octynyl)-5-oxocyclopent-1-eneoctanoic acid.

EXAMPLE 16

To a mixture consisting of 7 parts of potassium hydroxide dissolved in 13 parts of water and 100 parts by volume of ether is added 6 parts of N-nitrosomethylurea. The resulting mixture is stirred until most of the solid is dissolved and the yellow ethereal solution is decanted into a solution consisting of 1 part of 3-hydroxy-2-(4(RS)-hydroxy-1-octynyl)-5-oxocyclopent-1-eneheptanoic acid dissolved in 50 parts by volume of cold ether. The reaction mixture is allowed to stand at that temperature for several minutes, at the end of which time the excess reagent is destroyed by the dropwise addition of glacial acetic acid. When the ether solution becomes colorless, it is washed successively with cold water, cold dilute aqueous sodium bicarbonate and cold water, then dried over anhydrous sodium sulfate and concentrated to dryness under reduced pressure. The product thus obtained is further purified by adsorption on a silicic acid chromatographic column followed by elution with ethyl acetate-benzene mixtures, thus affording methyl 3-hydroxy-2-(4(RS)-hydroxy-1-octynyl)-5-oxocyclopent-1-eneheptanoate.

EXAMPLE 17

A mixture consisting of 25 parts of 3-hydroxy-2-(4(RS)-hydroxy-1-octynyl)-5-oxocyclopent-1-eneheptanoic acid, 10 parts of acetic anhydride and 10 parts of pyridine is allowed to stand at room temperature for about 16 hours, then is poured carefully into cold excess aqueous citric acid. The resulting aqueous mixture is allowed to stand at room temperature for about 1 hour, then is extracted several times with ether. The combined ether extracts are washed with cold water, dried over anhydrous sodium sulfate and concentrated under reduced pressure. The resulting residue is purified by adsorption on a silicic acid chromatographic column followed by elution with benzene-ethyl acetate mixtures, thus affording 3-acetoxy-2-(4(RS)-acetoxy-1-octynyl)-5-oxocyclopent-1-eneheptanoic acid.

EXAMPLE 18

A mixture consisting of 6.3 parts of 1-octyn-4(RS)-ol, 7.4 parts of phthalic anhdyride and 10 parts of pyridine is heated at the reflux temperature for about 3 hours, then let cool to room temperature, diluted with ether and washed with dilute hydrochloric acid. Extraction with dilute aqueous sodium hydroxide followed by acidification of the alkaline extract and extraction of the acidified mixture with ether affords an organic solution, which is dried over anhydrous sodium sulfate, decolorized with activated carbon, then stripped of solvent to afford 1-octyn-4(RS)-ol phthalate.

A mixture containing 2.24 parts of the latter ester, 0.99 part of L(-) α-methylbenzylamine and 125 parts by volume of dichloromethane is stirred for about 10 minutes, then stripped of solvent under reduced pressure and diluted with ether. The product is purified by recrystallization from cyclohexane to afford the 1-octyn-4(S)-ol phthalate L(-) α-methylbenzylamine salt, melting at about 109°–112°.

A mixture comprising 1.07 parts of the latter salt, 10 parts by volume of 1 N sodium hydroxide and 10 parts by volume of methanol is heated at about 60° for approximately 90 minutes, then is cooled and diluted with hexane. The hexane layer is separated, washed with water, dried over anhydrous sodium sulfate and stripped of solvent under reduced pressure to afford 1-octyn-4(S)-ol, characterized by an optical rotation in ether of −46.5°.

EXAMPLE 19

The substitution of D(+) α-methylbenzylamine in the procedure of Example 18 results in 1-octyn-4(R)-ol.

EXAMPLE 20

The substitution of an equivalent quantity of either 1-octyn-4(R)-ol or 1-octyn-4(S)-ol in the successive procedures described in Examples 6–9 results in 2-(4(R)-hydroxy-1-octynyl)-5-oxocyclopent-1-eneheptanoic acid and 2-(4(S)-hydroxy-1-octynyl)-5-oxocyclopent-1-eneheptanoic acid.

EXAMPLE 21

When an equivalent quantity of either 1-octyn-4(R)-ol 4-tetrahydropyran-2-yl ether or 1-octyn-4(S)-ol 4-tetrahydropyran-2-yl ether is substituted in the procedure of Example 13, Method A, there are obtained 3-hydroxy-2(4(R)-hydroxy-1-octynyl)-5-oxocyclopent-1-eneheptanoic acid and 3-hydroxy-2-(4(S)-hydroxy-1-octynyl)-5-oxocyclopent-1-eneheptanoic acid.

EXAMPLE 22

When an equivalent quantity of either 1-octyn-4(R)-ol or 1-octyn-4(S)-ol is substituted in the procedure of Example 13, Method B, there are obtained 3-hydroxy-2-(4(R)-hydroxy-1-octynyl)-5-oxocyclopent-1-eneheptanoic acid and 3-hydroxy-2-(4(S)-hydroxy-1-octynyl)-5-oxocyclopent-1-eneheptanoic acid.

What is claimed is:

1. A compound of the formula

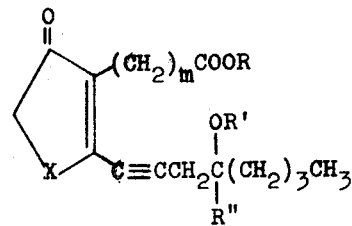

wherein X is a methylene, hydroxymethylene or (lower alkanoyl)oxymethylene radical, R is hydrogen or a lower alkyl radical, R' is hydrogen or a lower alkanoyl radical, R'' is hydrogen or a lower alkyl radical and $m$ is an integer greater than 5 and less than 8.

2. As in claim 1, a compound of the formula

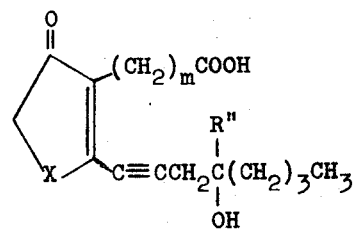

wherein R'' is hydrogen or a lower alkyl radical, X is a methylene or hydroxymethylene radical and $m$ is an integer greater than 5 and less than 8.

3. As in claim 1, a compound of the formula

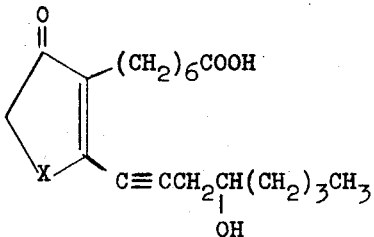

wherein X is a methylene or hydroxymethylene radical.

4. As in claim 1, the compound which is 2-(4(RS)-hydroxy-1-octynyl)-5-oxocyclopent-1-eneheptanoic acid.

5. As in claim 1, the compound which is 2-(4(RS)-hydroxyl-1-octynyl)-3-hydroxy-5-oxocyclopent-1-eneheptanoic acid.

6. As in claim 1, the compound which is 2-(4(R)-hydroxy-1-octynyl)-5-oxocyclopent-1-eneheptanoic acid.

7. As in claim 1, the compound which is 2-(4(S)-hydroxy-1-octynyl)-5-oxocyclopent-1-eneheptanoic acid.

8. As in claim 1, the compound which is 2-(4(R)-hydroxy-1-octynyl)-3-hydroxy-5-oxocyclopent-1-eneheptanoic acid.

9. As in claim 1, the compound which is 2-(4(S)-hydroxy-1-octynyl)-3-hydroxy-5-oxocyclopent-1-eneheptanoic acid.

* * * * *